United States Patent [19]
McKendree et al.

[11] Patent Number: 4,887,468
[45] Date of Patent: Dec. 19, 1989

[54] NONSYNCHRONOUS TURBINE BLADE VIBRATION MONITORING SYSTEM

[75] Inventors: Francis S. McKendree, Penn Hills, Pa.; Paul F. Rozelle, Fern Park, Fla.

[73] Assignee: Westinghouse Electric Corp., Pittsburgh, Pa.

[21] Appl. No.: 202,742

[22] Filed: Jun. 3, 1988

[51] Int. Cl.$^4$ ....................... G01M 1/22; G01H 11/00
[52] U.S. Cl. ..................................... 73/660; 324/207
[58] Field of Search ................. 73/654, 660; 324/207, 324/208

[56] References Cited

U.S. PATENT DOCUMENTS

| | | | |
|---|---|---|---|
| 3,467,358 | 9/1969 | Zablotsky et al. | 73/660 |
| 4,153,388 | 5/1979 | Naegeli et al. | 416/61 |
| 4,326,804 | 4/1982 | Mossey | 356/375 |
| 4,384,819 | 5/1983 | Baker | 415/14 |
| 4,413,519 | 11/1983 | Bannister et al. | 73/660 |
| 4,422,333 | 12/1983 | Leon | 73/660 |
| 4,507,658 | 3/1985 | Keating | 73/660 |
| 4,573,358 | 3/1986 | Luongo | 73/660 |
| 4,593,566 | 6/1986 | Ellis | 73/660 |
| 4,644,270 | 2/1987 | Oates et al. | 73/660 |

OTHER PUBLICATIONS

Jones, Development of a Noninterference Technique for Measuring Turbine Engine Rotor Blade Stresses, AIAA 21st Joint Propulsion Conference (1985).

Primary Examiner—Michael J. Tokar
Assistant Examiner—Lawrence G. Fess

[57] ABSTRACT

A nonsynchronous turbine blade vibration monitoring system is comprised of a maximum of two sensors circumferentially mounted along the turbine blade row for detecting the actual arrival times of the turbine blades at the sensors. Expected arrival times of the turbine blades at the sensors are determined and then compared to the actual arrival times in order to obtain turbine blade deflection data. Harmonic analysis is then performed on the blade deflection data to determine the level of vibration at each non-integral harmonic.

17 Claims, 6 Drawing Sheets

NONSYNCHRONOUS TURBINE BLADE VIBRATION MONITORING SYSTEM

BACKGROUND OF THE INVENTION

1. Field of the Invention

The present invention is directed generally to monitoring operating parameters in a steam turbine and, more specifically, to the monitoring of the vibration of rotating turbine blades.

2. Description of the Prior Art

Turbine blades, because of their complex design, are subject to vibration at frequencies which correspond to natural frequencies of the blades. Each natural frequency is associated with a particular mode which is a different type of vibration such as along the rotational axis of the turbine, perpendicular to the rotational axis of the turbine, etc. In order to prevent excessive vibration of the blade about its normal position, normal design practice dictates that the blades be constructed such that the frequencies of the lowest modes fall between harmonics of the operating frequency of the turbine. It is the case, however, that damaging nonsynchronous, i.e., non-integral harmonic, vibration may occur at the frequencies corresponding to these modes. Typically, nonsynchronous vibration in a steam turbine may occur as a result of buffeting wherein a low steam flow and a high back pressure cause the random excitation of the turbine blades or it may occur as a result of turbine rotor torsional stresses.

The nonsynchronous vibration may result in physical damage to the steam turbine. When the amplitude of the vibration exceeds a certain level, objectionable stresses are set up in the blade. If the condition is not detected and remedied, the blade may eventually fracture resulting in an extremely costly forced outage of the machinery. Thus, a method for detecting that nonsynchronous vibration is necessary to prevent such damage.

One prior art method for detecting turbine blade vibration is to attach strain gages to the turbine blades. Sensor information is communicated to analyzing equipment outside the machine by means of miniature transmitters affixed to the machine's rotating shaft at various locations. This prior art method suffers from three significant drawbacks. First, the strain gages have a very short life due to erosion caused by steam passing through the turbine blades. Second, each blade requires a strain gage if all blades in a row are to be monitored. This represents a significant expense. Additionally, only a limited number of transmitters and, therefore, sensors can be accommodated inside the machine. Third, the complexity of continuously and reliably supplying power to the strain gages and transmitting the signal reliably from the rotating rotor disk to stationary electronics creates severe difficulties.

To obviate these problems, apparatus exist for detecting turbine blade vibration which utilize permanently installed, non-contacting proximity sensors. One such apparatus is disclosed in U.S. Pat. No. 4,573,358 to Luongo wherein a plurality of sensors spaced about the periphery of the blade row detect vibration of operator selected blades. With this apparatus, one blade can be monitored at any given time. Unfortunately, physical difficulties exist in installing and mounting the plurality of sensors needed by the apparatus within the steam turbine. Additionally, this apparatus does not separate the torsional vibrations of the shaft and nonsynchronous vibrations of individual blades.

Another apparatus utilizing non-contacting proximity sensors is U.S. Pat. No. 4,593,566 to Ellis which utilizes two sensors which provide output signals upon the passage of the turbine blades. The disadvantage of this apparatus lies in its less flexible analog processing circuitry, the requirement of three sensors if individual blade vibrations are to be detected, and the non-differentiation between torsional and individual blade vibrations.

Thus, there is a need for a long-lived monitoring system that is easy to install, monitors all blades simultaneously, separates torsional vibration from the nonsynchronous vibration of individual blades, utilizes digital signal processing circuitry and that will measure nonsynchronous turbine blade vibration at a comparatively small expense. The present invention fills the need for such a nonsynchronous turbine blade vibration monitoring system.

SUMMARY OF THE INVENTION

The present invention is directed to a nonsynchronous turbine blade vibration monitoring system, which, in one embodiment, is comprised of a maximum of two sensors circumferentially mounted along a turbine blade row. The system also includes means for producing data based on the actual arrival times of the turbine blades at the sensors, means for producing data based on the expected arrival times of the turbine blades at the sensors and means for comparing the actual arrival time data to the expected arrival time data to obtain turbine blade deflection data. Harmonic analysis is performed on the blade deflection data to determine the level of vibration at each non-integral harmonic.

According to another embodiment of the present invention, the effects of noise are reduced by comparing the actual blade deflection data to reference blade deflection data to produce deviation data which is then subjected to the harmonic analysis.

According to another embodiment of the present invention, means are provided for extracting torsional vibration information from the blade deflection data.

The means for producing actual arrival time data may include a clock and a plurality of latches which are responsive to input signals generated in response to a blade passing event to latch the current clock time. An additional reference sensor responsive to the position of the turbine rotor produces a signal input to an additional latch which produces a reference signal representative of the position of the rotor.

The means for producing expected arrival time data can be embodied in any of three ways. The expected arrival times can be determined by measuring the rotational time of the turbine blade row, dividing that time by the number of sensors in the turbine blade row and indexing that result according to the position of the blade in the row. Alternate embodiments include providing timing marks on the turbine rotor or capturing actual arrival times and averaging those actual arrival times.

The present invention is also directed to a method of detecting the vibration of unshrouded turbine blades by generating input signals corresponding to blade passing events. This method also includes the steps of producing actual arrival time data from the input signals, producing expected arrival time data and comparing the actual arrival time data to the expected arrival time data to obtain turbine blade deflection data. Additional steps are performed to reduce the effects of noise on the turbine blade deflection data and to determine the level of vibration at each non-integral harmonic.

The nonsynchronous turbine blade vibration system of the present invention may be used in any steam turbine utilizing unshrouded turbine blades. In a typical steam turbine comprised of rows of high pressure, intermediate pressure and low pressure blades, the last rows in the low pressure turbine are unshrouded. The need for such a system exists because of the importance of monitoring the level of turbine blade vibration. Excessive vibration may result in the destruction of steam turbine components. The nonsynchronous turbine blade vibration monitoring system will alert an operator of a critical vibration level in addition to providing turbine engineers with valuable data regarding turbine blade stresses. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein.

DETAILED DESCRIPTION OF THE PREFERRED EMBODIMENT

Figure 1:
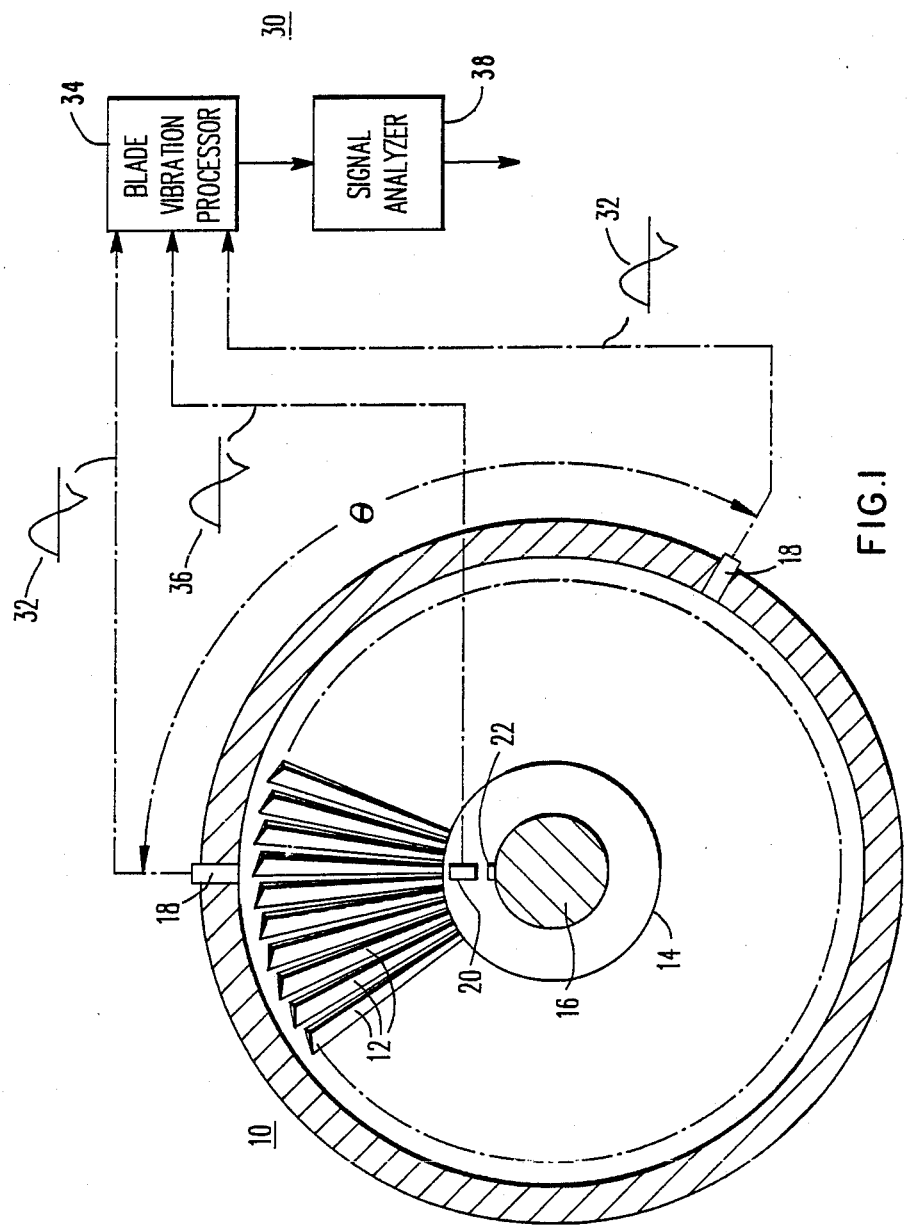
FIG. 1 illustrates an unshrouded turbine blade row in conjunction with the nonsynchronous vibration monitoring system of the present invention.

FIG. 1 illustrates an unshrouded turbine blade row 10 in which the method and apparatus of the present invention to monitor nonsynchronous turbine blade vibration can be employed. Like reference numerals are employed among the various figures to designate like elements. Turbine blades 12 are connected to a rotor 16 by means of a rotor disk 14. Although FIG. 1 only shows several turbine blades 12, the reader will understand that more than one hundred turbine blades 12 may be contained within a single row 10 of blades 12 and that the turbine rotor 16 may carry several rows 10 of blades 12.

A nonsynchronous turbine blade vibration monitoring system 30 of the present invention is also shown in FIG. 1. The system 30 includes two turbine blade sensors 18 which are the means for monitoring the vibration of the turbine blades 12. The sensors 18 may be variable reluctance sensors or may incorporate any practical method of sensing a blade passing event including, but not limited to, microwave or optical methods. The sensors 18 may be displaced from one another by an angle $\theta$ of, for example, 135°. One type of sensor which can withstand the rigors of the interior of the steam turbine is described in U.S. Pat. No. 4,644,270. A method of mounting the sensors 18 in the steam turbine is disclosed in U.S. patent application Ser. No. 172,614 entitled SENSOR PROBE SYSTEM filed Mar. 24, 1988 which is assigned to the same assignee as the present invention and is hereby incorporated by reference.

As further illustrated in FIG. 1, a reference sensor 20 is additionally provided. The sensor 20 in conjunction with indicia 22 on the rotor 16 is operable to provide an output signal once per rotor 16 revolution. The production of such a reference signal is commonly known in the turbine art.

Input signals 32 from turbine blade sensors 18 are provided as inputs to a blade vibration processor 34. A signal 36 from reference sensor 20 is additionally provided as an input to the blade vibration processor 34. The output of the blade vibration processor 34 is input to a signal analyzer 38 which performs signal conditioning and non-integral harmonic analysis.

Figure 2:
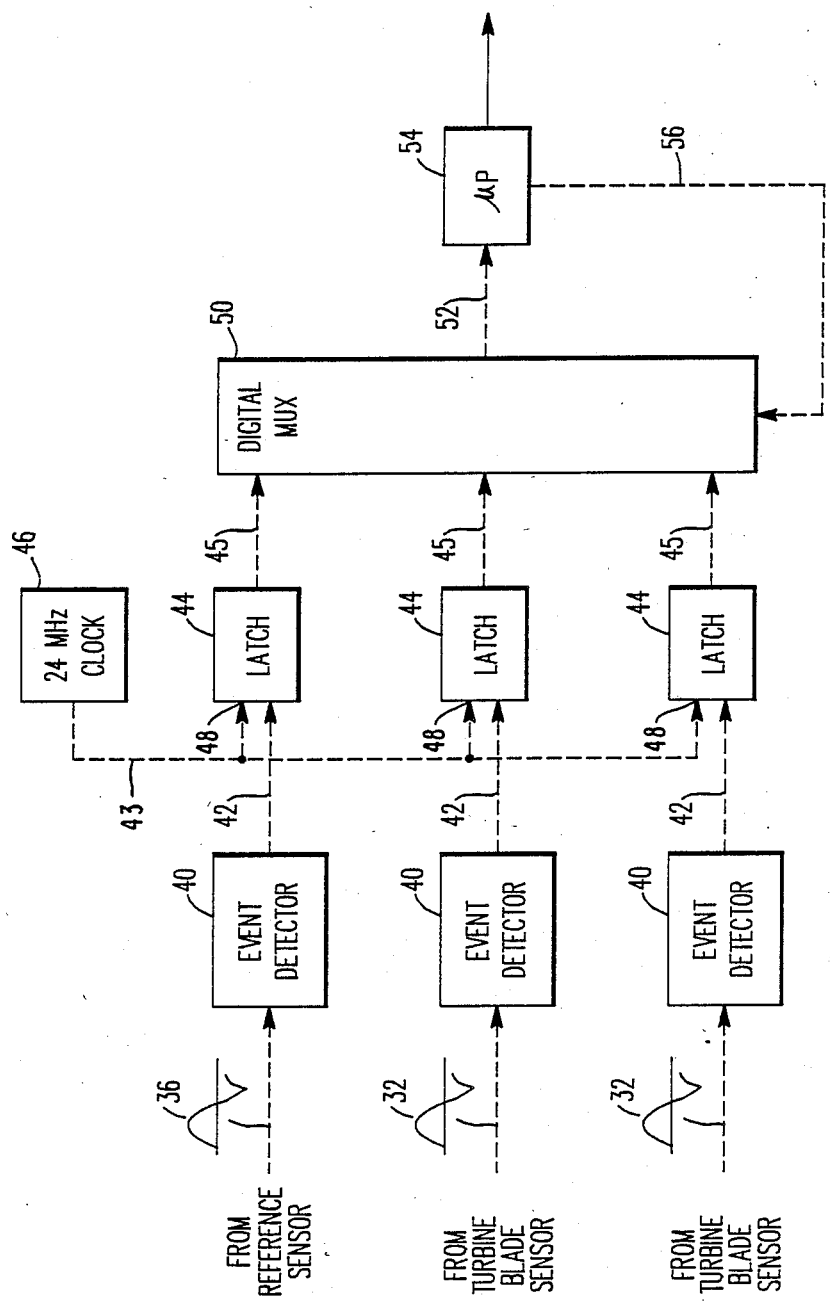
FIG. 2 illustrates the details of the blade vibration processor of FIG. 1.

Details of the blade vibration processor 34 of FIG. 1 are illustrated in FIG. 2. Signals 32 from turbine blade sensors 18 are each input to an event detector 40. Event detectors 40 produce output pulses in response to blade passing events. Suitable circuitry for producing an output pulse in response to a blade passing event is known. See, for example, U.S. Pat. No. 4,593,566 which is hereby incorporated by reference. The signal 36 from reference sensor 20 is input to a third event detector 40. Signals 42 from the event detectors 40 indicate the passing of a turbine blade 12 (in the case of turbine blade sensor signals 32) and the detection of the reference indicia 22 (in the case of reference sensor signal 36) and are each input to a latch 44. A twenty-four MHz clock 46, or a clock of other suitable frequency, provides a clock signal 43 input at a clock input terminal 48 of each of the latches 44. The signals 42 generated by each of the event detectors 40 cause the latch 44 driven by the particular signal 42 to store the current clock time which is found at clock input 48. Thus, signals 45 available at outputs of each of the latches 44 represent the time when a blade 12 passed a sensor 18 or the indicia 22 on the rotor 16 passed the sensor 20. A digital multiplexer 50 multiplexes signals 45 from each of the latches 44 and provides a digitally multiplexed signal 52 to microprocessor 54. The microprocessor 54, through control line 56, controls the data flow through the multiplexer 50 and provides reset capabilities for latches 44.

Figure 3:
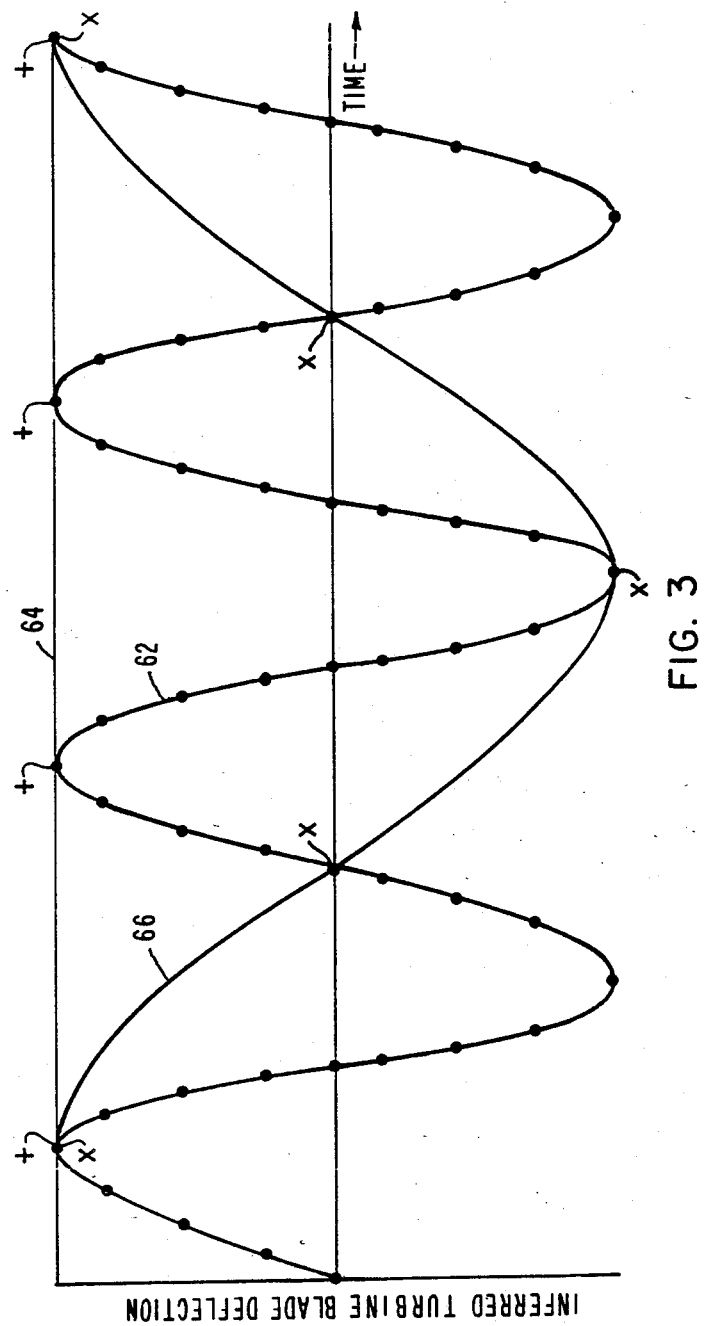
FIG. 3 is a graphical representation of typical turbine blade deflection as a function of time.

A graphical representation of typical turbine blade 12 deflection as a function of time is illustrated in FIG. 3. The plot of deflection as a function of time is sinusoidal in nature with an amplitude and frequency equal to that of the amplitude and frequency of vibration of the turbine blade 12 of interest A sine wave 62 represents the actual turbine blade 12 deflection. Sampling the sine wave 62 at a rate such that data is obtained only at the points denoted by the "+" symbols results in the sensing of a signal 64 having constant amplitude. Similarly, sampling sine wave 62 at a rate denoted by the "×" symbols results in a signal 66 having an amplitude equal to that of the actual turbine blade 12 deflection signal 62 but with a frequency equal to one-third that of the actual deflection signal 62. Signal 64 illustrates the loss of deflection information which results from sampling data at a frequency less than that of the frequency of turbine blade 12 deflection. Signal 66 illustrates the ambiguity which may result when data is sampled at a frequency less than twice that of the frequency of turbine blade 12 deflection. That latter phenomena is known as aliasing. As can be seen, resolution between vibrations of close frequencies is a function of the data sampling rate.

Figure 4:
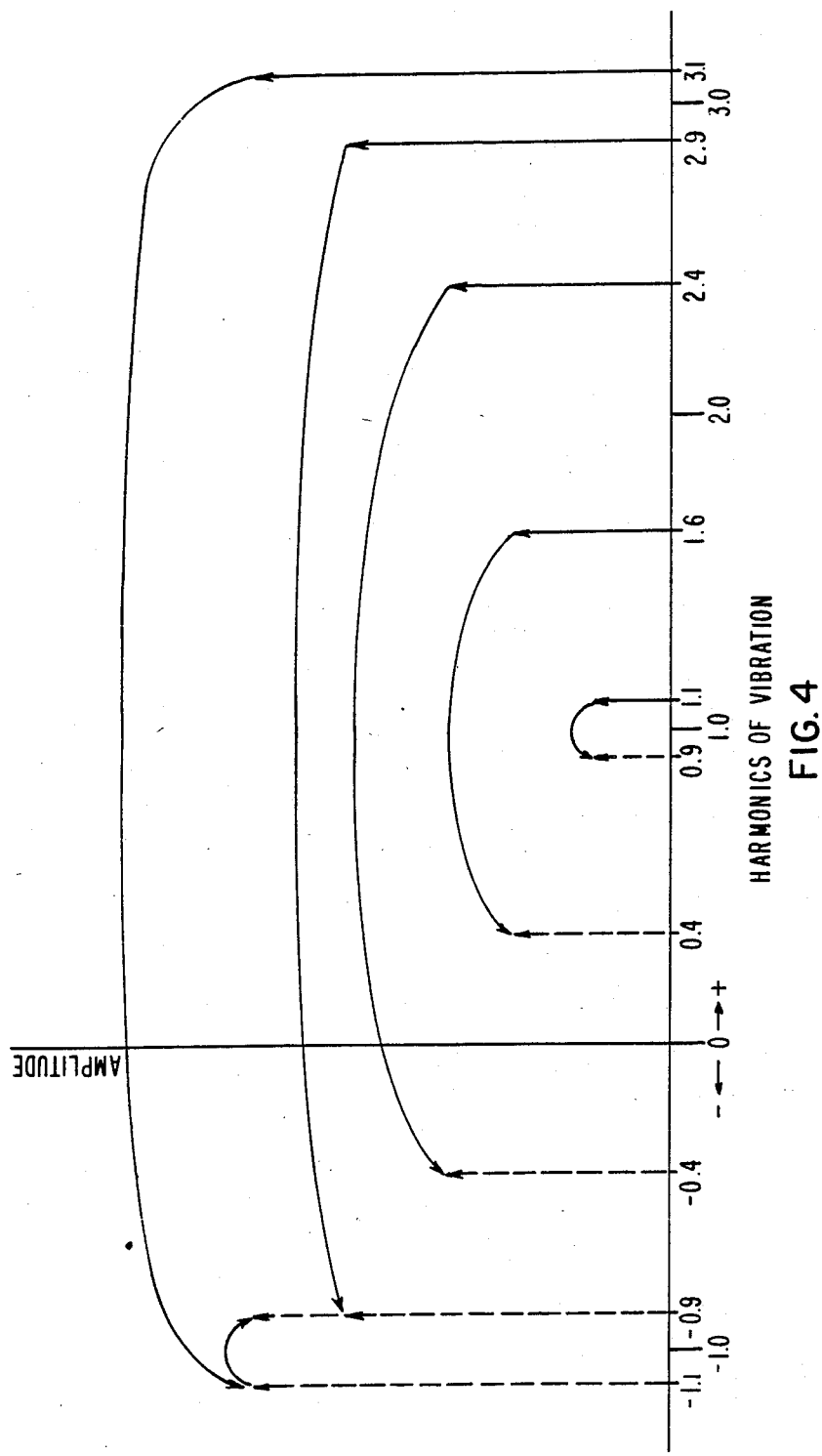
FIG. 4 illustrates a spectrum of actual and aliased frequencies of vibration of a turbine blade.

According to a fundamental sampling theorem, for any n pieces of data sampled, n/2 changes may be detected. It follows that in the case of a turbine blade row 10, that twenty-four turbine blade sensors 18 will detect vibration up to the 12th harmonic of the fundamental frequency which is the frequency of rotation of the turbine blade row 10. It is likewise evident that if two turbine blade sensors 18 are used, as in the present invention, vibration up to the 1st harmonic of the fundamental frequency will be detected. In a twenty-four turbine blade sensor system, that limitation does not pose a problem as all significant frequencies of turbine blade 12 vibration are less than the 12th harmonic. In a two turbine blade sensor system 30, however, all frequencies of vibration greater than the fundamental frequency are aliased to a frequency less than that of the fundamental frequency. FIG. 4 illustrates the results of that aliasing. The solid arrows represent the actual frequencies of vibration while the dashed arrows represent the aliased frequencies actually detected by the system 30. In a two turbine blade sensor system 30, the reflection points for the aliasing occur at plus or minus the fundamental frequency. The consequences of that limitation can be alleviated by utilizing an additional turbine blade sensor 18 which will provide an additional sampling point. However, the present invention is designed to operate using only two sensors 18.

Figure 5:
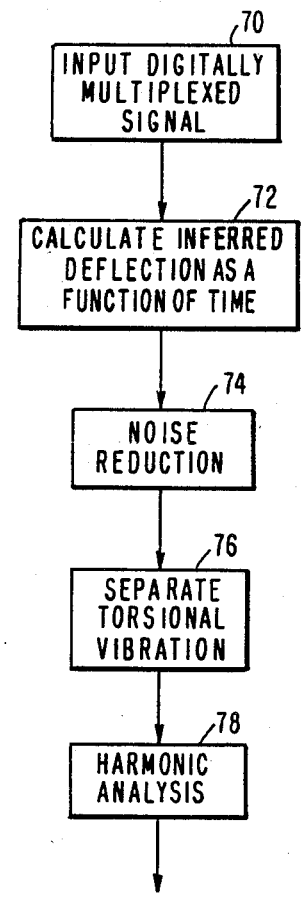
FIG. 5 is a flow chart illustrating the steps performed by the microprocessor of the signal analyzer of FIG. 1.

A flow chart of the steps performed by the microprocessor 54 of FIG. 2, the basic component of the signal analyzer 38 of FIG. 1, is illustrated in FIG. 5. The multiplexed digital signal 52 is input to microprocessor 54 in step 70. The multiplexed digital signal 52 contains the turbine blade 12 arrival times as well as the rotor indicia 22 arrival time. The rotor indicia 22 arrival time permits the correlation of the turbine blade 12 arrival times to individual turbine blades 12. Either of two known correlation algorithms may be used depending upon the quality of the arrival time data. It sometimes happens that the first attempt to associate blade 12 arrival times with the blades 12 causing them fails because of differences between the assumed and the actual blade 12 positions. The present invention, by storing the blade 12 arrival times, is capable of detecting this failure and correcting for it, so that no data is lost or compromised in quality.

The microprocessor 54, in step 72, calculates the inferred deflection for any particular turbine blade 12 as a function of time. The inferred turbine blade 12 deflection may be calculated by using the following equation:

$$x = v * \Delta t$$

where
x = turbine blade displacement (mils)
v = rotational velocity of the turbine blades (mils/$\eta$ sec)
$\Delta t$ = turbine blade arrival time deviation ($\eta$ sec)

The quantity $\Delta t$ (turbine blade arrival time deviation) is the difference between the actual arrival time of the turbine blade 12 at the turbine blade sensor 18 as detected by event detector 40 and as communicated to the microprocessor 54 via the digitally multiplexed signal 52 and the expected arrival time of the turbine blade 12 at the turbine blade sensor 18. The expected arrival time of the turbine blades 12 at the turbine blade sensor 18 can be determined in any one of three ways.

The first method of determining the expected arrival time of each turbine blade 12, which can be used when the sensors 18 are equally spaced, is to divide the rotational time for the complete turbine blade row 10 by the number of turbine blade sensors 18 and then index that time interval between turbine blade sensor 18 arrival times by the number (with respect to the reference indicia 22 on the rotor 16) of the turbine blade 12 of interest. A second method involves providing a plurality of timing marks on the rotor 16. A third method of determining the expected arrival time of each turbine blade 12 involves the averaging of historical data representative of all turbine blade 12 arrival times. This last method has the advantage of eliminating the rotor 16 torsional vibration which is vibration common to all turbine blades 12. Since the blade vibration processor 34 is capable of storing all of the arrival times from each sensor 18, 20 during the period of interest, any one or combination of these three methods may be used without excluding the ability to use the others.

Figure 6:
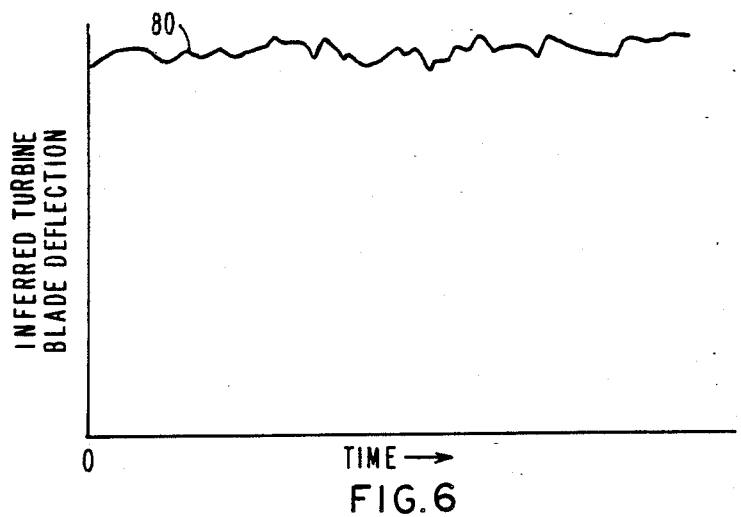
FIG. 6 illustrates a signal representing turbine blade displacement as a function of time absent the application of the noise reduction technique of the present invention.
Figure 7:
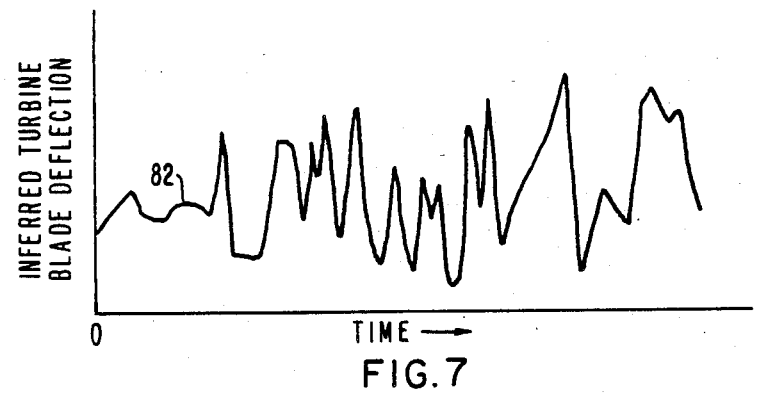
FIG. 7 illustrates a signal representing the same displacement as that shown in FIG. 6 subsequent to performing the present invention's noise reduction technique.

A noise reduction process is then performed by the microprocessor 54 in step 74. That noise reduction is performed by comparison of the inferred turbine blade 12 deflection data as calculated in step 72 with reference data which is representative of measured turbine blade 12 deflection data under conditions where the turbine blade 12 is assumed not to be vibrating to produce deviation data representative of the difference therebetween. Reference data can be used in this noise reduction technique even if it is not measured under conditions of absolute non-vibration of the turbine blade 12 as long as the reference data is not measured under conditions of extreme turbine blade 12 vibration because any variation in vibration from the reference data will be detected by the system 30. FIG. 6 illustrates a signal 80 representing inferred turbine blade 12 deflection as a function of time absent any noise reduction techniques. FIG. 7 illustrates a signal 82 representing the same deflection subsequent to performing the above described noise reduction technique on the signal 80.

The rotor 16 torsional vibration is removed from the noise reduced data 82 in step 76. The removal of that torsional vibration is accomplished by subtracting the vibratory elements (amplitude and frequency of torsional vibration) common to all turbine blades 12. Thus, the present invention detects torsional vibration of the turbine blades 12 at the blades 12 themselves unlike shaft end measurement techniques, for which the entire rotor 16 mode shape must be known precisely in order to infer the blade 12 stress. This torsional vibration can also be removed by employing the third method of calculating expected arrival times (averaging historical data) of the turbine blades 12 in step 72.

A Fourier analysis, or other suitable mathematical technique, is then performed on the resulting inferred turbine blade 12 deflection data in step 78. The resulting frequency spectrum can be represented by an amplitude versus frequency plot which results in aliased frequencies such as those of FIG. 4. An alternative method of performing this harmonic analysis is by correlation with families of orthogonal sine and cosine functions. The frequencies of the orthogonal sine and cosine functions may be adjusted so as to detect the precise aliased frequency of vibration of interest. The phase angle between samples of these functions is determined by the angle θ separating the two sensors 18. This entire signal analysis process may be repeated for any or all turbine blades 12 in a turbine blade row 10.

Additional signal analysis steps allow searching for the most responsive turbine blade 12 at a particular frequency, averaging the response of all turbine blades 12 at a particular frequency, determining the most responsive frequencies and plotting and printing various data summaries. That information may be utilized by engineers or turbine operators in evaluating the vibration levels in individual turbine blades 12.

Additionally, the stress at any point in the turbine blade 12 can be inferred from the amplitude of the vibration at any given frequency. In general, at higher frequencies, the stress at any point in the turbine blade 12 is greater for any given turbine blade 12 deflection than for the same deflection at a lower frequency.

While the present invention has been described in connection with an exemplary embodiment thereof, it will be understood that many modifications and variations will be readily apparent to those of ordinary skill in the art. This disclosure and the following claims are intended to cover all such modifications and variations.

We claim:

1. An apparatus for detecting the vibration of unshrouded turbine blades configured in a row, comprising:
   a maximum of two sensor means circumferentially mounted along the turbine blade row;
   means responsive to said sensor means for producing data based on the actual arrival times of the blades at said sensor means;
   means for producing data based on the expected arrival times of the blades at said sensor means;
   means for comparing said actual arrival time data to said expected arrival time data to obtain turbine blade deflection data; and
   analysis means for extracting from said turbine blade deflection data torsional vibration data and the extent of vibration at each non-integral harmonic.

2. The apparatus of claim 1 additionally comprising means for providing reference blade deflection data and for comparing said turbine blade deflection data to said reference data to produce deviation data, and wherein said analysis means is responsive to said deviation data.

3. The apparatus of claim 1 wherein said sensor means includes two sensors each producing input signals in response to a blade passing event, and wherein said means for producing actual arrival time data includes a clock means and a plurality of latches responsive to said input signals to latch the counter value of said clock means.

4. The apparatus of claim 3 wherein the turbine blades are carried by a shaft, the apparatus additionally comprising reference sensor means responsive to the position of the shaft, said reference sensor means for producing a signal input to one of said plurality of latches to latch the current time in said clock means, said means for producing expected arrival time data being responsive to said latch.

5. The apparatus of claim 1 wherein said analysis means includes means for performing a Fourier analysis on said turbine blade deflection data.

6. A steam turbine having a system for detecting vibration, comprising:
   a rotor;
   a plurality of unshrouded turbine blades arranged in rows carried by said rotor;
   sensor means circumferentially mounted along the turbine blade rows;
   means, responsive to said sensor means, for producing data based on the actual arrival times of said blades at said sensor means;
   means for producing data based on the expected arrival times of said blades at said sensor means;
   means for comparing said actual arrival time data to said expected arrival time data to obtain turbine blade deflection data; and
   analysis means for extracting from said turbine blade deflection data torsional vibration data and the extent of vibration at each non-integral harmonic.

7. The apparatus of claim 6 wherein said means for producing expected arrival times includes means for measuring the time of rotation of the blade row, means for dividing said time by the number of said sensor means in the row, and means for indexing the result according to the position of the blade within the row.

8. The apparatus of claim 6 wherein said means for producing expected arrival times includes means for providing a plurality of timing marks on said rotor.

9. The apparatus of claim 6 wherein said means for producing expected arrival times includes means for averaging said actual arrival times and wherein said average arrival times are used as the expected arrival times.

10. The system of claim 6 wherein said sensor means includes first and second magnetic sensors.

11. The system of claim 6 additionally comprising means for reducing the effects of noise on said blade defection data.

12. A method of detecting the vibration of unshrouded turbine blades, comprising the steps of:
   generating input signals corresponding to blade passing events;
   producing actual arrival time data from said input signals;
   producing expected arrival time data;
   comparing said actual arrival time data to said expected arrival time data to obtain turbine blade deflection data; and
   extracting from said turbine blade deflection data torsional vibration data and the extent of vibration at each non-integral harmonic.

13. The method of claim 12 additionally comprising the step of reducing the effects of noise on said turbine blade deflection data.

14. The method of claim 12 wherein said step of producing expected arrival time data includes the steps of measuring the rotational time of the turbine blade, dividing the time by the number of sources of blade passing event input signals per row, and indexing the result according to the position of the blade within the row.

15. The method of claim 12 wherein said step of producing expected arrival time data includes the step of sensing a plurality of timing marks on a rotor carrying the turbine blades.

16. The method of claim 12 wherein said step of producing expected arrival time data includes the step of averaging said actual arrival data.

17. The method of claim 12 wherein said step of extracting the vibration at each non-integral harmonic includes the step of performing a Fourier analysis on said turbine blade deflection data.

* * * * *